(12) United States Patent
Itoh

(10) Patent No.: US 10,654,234 B2
(45) Date of Patent: May 19, 2020

(54) TIRE BUILDING DRUM

(71) Applicant: BRIDGESTONE CORPORATION, Tokyo (JP)

(72) Inventor: Tatsuya Itoh, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 616 days.

(21) Appl. No.: 15/317,671

(22) PCT Filed: May 11, 2015

(86) PCT No.: PCT/JP2015/063420
§ 371 (c)(1),
(2) Date: Dec. 9, 2016

(87) PCT Pub. No.: WO2015/190197
PCT Pub. Date: Dec. 17, 2015

(65) Prior Publication Data
US 2017/0129198 A1 May 11, 2017

(30) Foreign Application Priority Data

Jun. 12, 2014 (JP) ................................. 2014-121440

(51) Int. Cl.
*B29D 30/26* (2006.01)
*B29D 30/24* (2006.01)
(Continued)

(52) U.S. Cl.
CPC ............. *B29D 30/26* (2013.01); *B29D 30/08* (2013.01); *B29D 30/24* (2013.01); *B29D 30/242* (2013.01);
(Continued)

(58) Field of Classification Search
CPC .... B29D 30/00; B29D 30/0661; B29D 30/08; B29D 30/12; B29D 30/24; B29D 30/242;
(Continued)

(56) References Cited

U.S. PATENT DOCUMENTS

2004/0050499 A1* 3/2004 Barody ................ B29D 30/246
156/417
2005/0247393 A1 11/2005 Misani et al.
(Continued)

FOREIGN PATENT DOCUMENTS

CN 1628022 A 6/2005
EP 1242195 B1 * 11/2003 ............. B05D 5/086
(Continued)

OTHER PUBLICATIONS

Eigenbrod Volkmar, EP-1242195, machine translation. (Year: 2003).*
(Continued)

*Primary Examiner* — Robert C Dye
*Assistant Examiner* — Sedef E Paquette
(74) *Attorney, Agent, or Firm* — Sughrue Mion, PLLC

(57) ABSTRACT

A tire building drum (10) is used to build a large green tire. The tire building drum (10) comprises: a cylindrical drum main body (12) having an outer peripheral surface (14) a diameter of which is capable of being increased and reduced; and a coating (16) formed on the outer peripheral surface of the drum main body. The coating (16) includes a silicon layer (26) defining a surface of the coating (16), and the silicon layer has a surface roughness Ra of 10 μm or greater. The tire building drum (10) requires no application of stearic acid onto the surface thereof in release of the green tire.

1 Claim, 3 Drawing Sheets

(51) Int. Cl.
*B29D 30/08* (2006.01)
*B29D 30/06* (2006.01)

(52) U.S. Cl.
CPC .... *B29D 30/244* (2013.01); *B29D 2030/0616* (2013.01); *B29D 2030/2642* (2013.01)

(58) Field of Classification Search
CPC .. B29D 30/244; B29D 30/245; B29D 30/246; B29D 30/247; B29D 30/248; B29D 30/26; B29D 30/36; B29D 2030/0616; B29D 2030/2642; B29D 2030/265; B29D 2030/2657; C23C 4/04; C23C 4/067; B32B 15/00; B32B 15/18; B32B 9/005; B32B 2264/107
USPC .......................................................... 156/414
See application file for complete search history.

(56) References Cited

U.S. PATENT DOCUMENTS

2007/0102120 A1    5/2007  Yoshii
2008/0017074 A1*   1/2008  Park ........................ A47J 36/04
                                                        106/404

FOREIGN PATENT DOCUMENTS

| JP | 2002-172709 A | 6/2002 |
| JP | 2002-234081 A | 8/2002 |
| JP | 2004-90503 A  | 3/2004 |
| JP | 2004-181950 A | 7/2004 |
| JP | 2006-110760 A | 4/2006 |
| JP | 2007-050538 A | 3/2007 |
| JP | 2007076248 A  | 3/2007 |
| JP | 2007-98664 A  | 4/2007 |
| JP | 2007-224458 A | 9/2007 |
| JP | 2012-143946 A | 8/2012 |

OTHER PUBLICATIONS

ThomasNet, Ceramic Coatings for Metal Parts, p. 1. (Year: 2013).*
Nakamura et al. (Effects of Pores on Mechanical Properties of Plasma-Sprayed Ceramic Coatings, J. Am. Ceram. Soc., vol. 83, No. 3, Mar. 2000, p. 578). (Year: 2000).*
International Search Report for PCT/JP2015/063420 dated Jul. 28, 2015.
Search Report dated Feb. 28, 2018 from the State Intellectual Property Office of the P.R.C. in counterpart Chinese application No. 2015800314463.

* cited by examiner

TIRE BUILDING DRUM

CROSS REFERENCE TO RELATED APPLICATIONS

This application is a National Stage of International Application No. PCT/JP2015/063420 filed May 11, 2015, claiming priority based on Japanese Patent Application No. 2014-121440 filed Jun. 12, 2014, the contents of all of which are incorporated herein by reference in their entirety.

TECHNICAL FIELD

The present invention relates to a tire building drum around which tire building members such as an inner liner and a belt are wound to build a large green tire.

BACKGROUND ART

Conventionally, as a tire building drum for a tire to be fitted to a passenger vehicle and the like, there is disclosed a cylindrical tire building drum configured such that the diameter of the drum can be increased and reduced and a cylindrical rubber band with high stretchability is disposed on a surface (outer peripheral surface) of the drum (for example, see Patent Literature 1). The rubber band protects an inner surface of the green tire.

A large tire used in construction equipment and the like has a larger tire diameter than the tire for a passenger vehicle. Accordingly, it is more difficult to fit a rubber band to a tire building drum used to build a large green tire. Due to such circumstances, a surface of the tire building drum for the large green tire is subjected to processing for facilitating release of the green tire. As an example of such processing, stearic acid is applied onto the surface of the tire building drum (for example, see Patent Literature 2).

CITATION LIST

Patent Literature

Patent Literature 1: Japanese Patent Application Publication No. 2002-172709
Patent Literature 2: Japanese Patent Application Publication No. 2004-90503

SUMMARY OF INVENTION

Technical Problem

However, application of stearic acid onto the surface of the building drum for the large green tire has a problem that the application needs to be performed every time the green tire is to be built and the application takes long time, thereby reducing the production efficiency of the green tire.

An object of the present invention is to provide a tire building drum which is used to build a large green tire and which requires no application of stearic acid onto the surface of the drum for release of the green tire.

Solution to Problem

A tire building drum used to build a large green tire of the present invention comprises a cylindrical drum main body having an outer peripheral surface a diameter of which is capable of being increased and reduced; and a coating formed on the outer peripheral surface of the drum main body. The coating includes a silicon layer defining a surface of the coating, and the silicon layer has a surface roughness Ra (arithmetic mean roughness) of 10 μm or greater.

The coating may include a sprayed ceramic layer impregnated with part of the silicon layer.

The coating may further include a sprayed stainless steel layer having a surface roughness Ra of 16 μm or greater and fixedly adhering to the outer peripheral surface of the drum main body. In this case, the sprayed ceramic layer is formed on the sprayed stainless steel layer.

A thickness dimension of the silicon layer, a thickness dimension of the sprayed ceramic layer, and a thickness dimension of the sprayed stainless steel layer may be set to any value within a range of 10 to 20 μm, a range of 40 to 60 μm, and a range of 80 to 120 μm, respectively.

DESCRIPTION OF EMBODIMENTS

Figure 1:
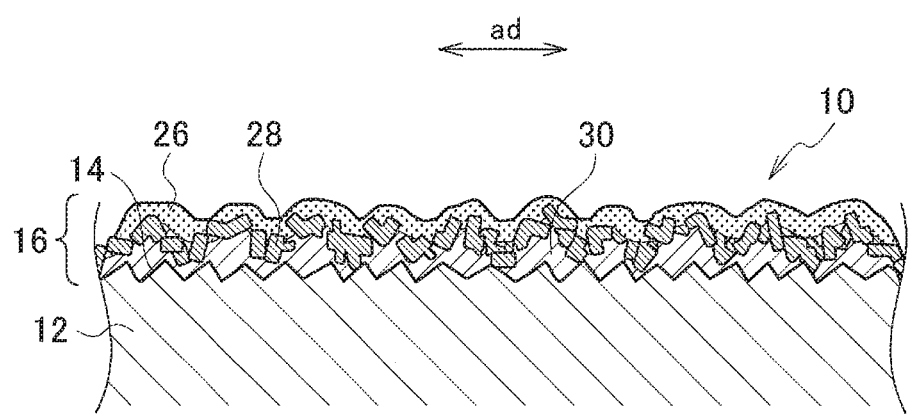
FIG. 1 is a partial vertical cross-sectional view of a tire building drum including a drum main body and a coating formed on an outer peripheral surface of the drum main body.

Referring to FIG. 1, a tire building drum 10 used to build a large green tire is partially illustrated. Specifically, FIG. 1 illustrates a partial vertical cross-sectional view of the tire building drum 10. The green tire to be built has a rim diameter of 25 to 63 inches, and the tire building drum 10 has a drum diameter of 860 to 2190 mm. The tire building drum 10 has a cylindrical shape and includes: a drum main body 12 having an outer peripheral surface 14 the diameter of which can be increased and reduced; and a coating 16 formed on the outer peripheral surface 14, as will be described later. In the building of the green tire, an inner liner, a PLY carcass, a reinforcement rubber, and the like which are building members of the green tire are wound around the coating 16.

Figure 2:
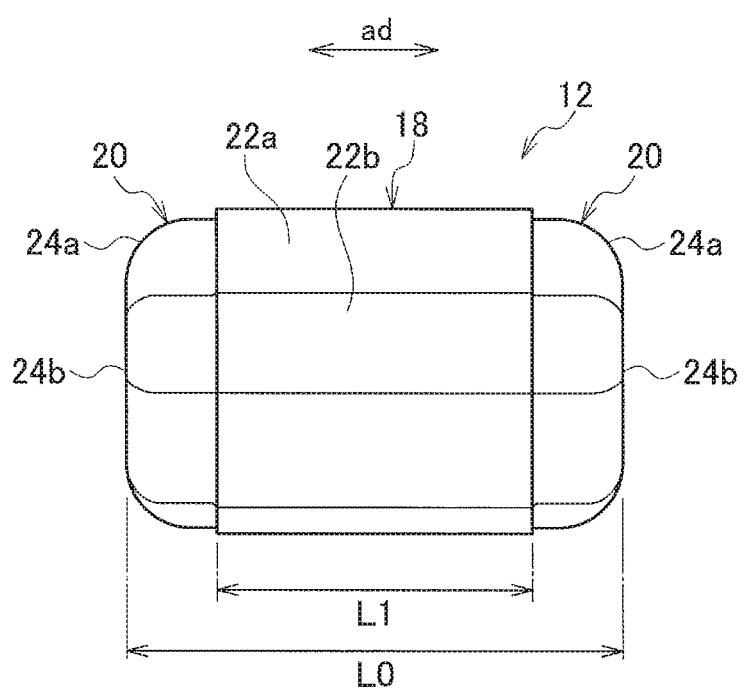
FIG. 2 is a front view of the drum main body on which the coating is formed.

As illustrated in FIG. 2, the drum main body 12 includes a cover plate portion 18 and a pair of segment portions 20. The pair of segment portions 20 are located respectively on both sides of the cover plate portion 18 in an axial direction ad of the drum main body 12 and are movable in the axial direction ad relative to the cover plate portion 18. The length dimension of the drum main body 12 in the axial direction ad can be changed by moving the segment portions 20 in the axial direction ad relative to the cover plate portion 18.

For example, the coating 16 is formed only on an outer periphery of the cover plate portion 18 when the length dimension L1 (FIG. 2) of the cover plate portion 18 of the drum main body 12 in the axial direction ad is equal to or greater than 50% of the length L0 of the drum main body 12. Meanwhile, the coating 16 is formed on both of the outer peripheral surface of the cover plate portion 18 and outer peripheral surfaces of the pair of segment portions 20 when the length dimension L1 is smaller than 50% of the length L0 of the drum main body 12. When the coating 16 is formed only on the outer peripheral surface of the cover plate portion 18, the outer surfaces of the segment portions 20 may be subjected to shot blasting using a shot material with a grit number of 200 (#200) and further subjected to plating.

The cover plate portion 18 includes multiple plates 22a and 22b elongating in the axial direction ad as a whole. Moreover, each of the segment portions 20 includes multiple plates 24a and 24b elongating in the axial direction ad as a whole.

Each of the plates 22a has a greater length dimension in a circumferential direction of the drum main body 12, that is, a greater width dimension than each of the plates 22b. Similarly, each of the plates 24a has a greater width dimension than each of the plates 24b. The plates 22a with the large width dimension and the plates 22b with the small width dimension are alternately arranged in the circumferential direction of the drum main body 12 while being in contact with one another, and the plates 24a with the large width dimension and the plates 24b with the small width dimension are alternately arranged in the circumferential direction of the drum main body 12 while being in contact with one another.

The plates 22a and 22b and the plates 24a and 24b each have a surface formed of a partial cylindrical surface defining part of the outer peripheral surface (cylindrical surface) of a corresponding one of the cover plate portion 18 and the segment portions 20. The coating 16 is formed to cover both of the surfaces of the plates 22a and 22b and the surfaces of the plates 24a and 24b or only the surfaces of the plates 22a and 22b.

The plates 22a and 22b and the plates 24a and 24b are each supported to be movable in a radial direction of the drum main body 12. Accordingly, the outer peripheral surface 14 of the drum main body 12 can be set to an increased diameter state (state illustrated in FIG. 2) by moving the plates 22a and 22h and the plates 24a and 24b outward in the radial direction. In the increased diameter state of the outer peripheral surface 14 of the drum main body 12, the tire building members (not illustrated) such as the inner liner, the PLY carcass, and the reinforcement rubber are wound around the outer peripheral surface 14 for the building of the green tire.

Moreover, the outer peripheral surface 14 of the drum main body 12 in the increased diameter state can be set to a state (not illustrated) where the diameter of the outer peripheral surface 14 is reduced to the rim diameter of the green tire or smaller, by moving the plates 22a and 22b and the plates 24a and 24b inward in the radial direction. More specifically, the plates 22b and 24b with the small width dimensions are moved inward in the radial direction and then the plates 22a and 24a with the large width dimensions are moved inward in the radial direction to form the outer peripheral surface 14 with the reduced diameter defined by the plates 22a and 24a with the large width dimensions, at the peripheries of the plates 22b and 24b with the small width dimensions moved in advance. The green tire is removed from the periphery of the drum main body 12 after the outer peripheral surface 14 is set to the reduced diameter state.

As illustrated in FIG. 1, the coating 16 includes a silicon layer 26 defining the surface of the coating. The silicon layer 26 is set to have a surface roughness Ra of 10 μm or greater. The surface roughness Ra appropriately reduces the adhesiveness and friction performance of a silicon surface forming the silicon layer 26, and provides a relatively good release performance for the inner liner of the green tire built in contact with the silicon layer 26. Accordingly, it is possible to easily release the large green tire from the tire building drum 10 and thus eliminate the use of stearic acid in the conventional technique.

Meanwhile, silicon has a property of not fixedly adhering well onto the outer peripheral surface 14 of the drum main body 12. Moreover, silicon also has a property of not fixedly adhering well to a sprayed stainless steel layer 30 to be described later. Accordingly, it is preferable to form the silicon layer 26 on the outer peripheral surface 14 of the drum main body 12 or the sprayed stainless steel layer 30 with a sprayed ceramic layer 28 provided therebetween, the sprayed ceramic layer 28 formed by using ceramic (for example, black ceramic) as a sprayed material. Since the sprayed ceramic layer 28 has a porous structure, the sprayed ceramic layer 28 is impregnated with part of the silicon layer 26.

For example, in order to set the surface roughness Ra of the silicon layer 26 to 10, the outer peripheral surface 14 of the drum main body 12 is roughened by being subjected to shot blasting using a shot material with a grit number of 100 (#100) and then the sprayed stainless steel layer 30 is formed by spraying a spray material (stainless steel) on the outer peripheral surface 14 subjected to the shot blasting. The sprayed stainless steel layer 30 formed as described above has a surface roughness Ra=18.

Then, the sprayed ceramic layer 28 is formed on the thusformed sprayed stainless steel layer 30 and the silicon layer 26 is made to fixedly adhere to the sprayed ceramic layer 28. In this case, the roughness on the outer peripheral surface 14 of the drum main body 12 and the roughness on the surface of the sprayed stainless steel layer 30 appear on the surface of the silicon layer 26 through the sprayed ceramic layer 28. The roughness on these surfaces forms the surface roughness (Ra=10) on the surface of the silicon layer 26.

In this case, the thickness dimension of the silicon layer 26, the thickness dimension of the sprayed ceramic layer 28, and the thickness dimension of the sprayed stainless steel layer 30 can be set to any value within a range of 10 to 20 μm, a range of 40 to 60 μm, and a range of 80 to 120 μm, respectively.

In the release of the built green tire from the tire building drum 10, after the plates 22b and 24b with the small width dimensions are moved inward in the radial direction, the peripheral surface partially defined by the surfaces of the unmoved plates 22a and 24a with the large width dimensions is rubbed against the inner surface of the green tire. Accordingly, the coating 16 needs to have a slip property. Moreover, when the plates 22a and 24a with the large width dimensions are moved inward in the radial direction and the outer peripheral surface 14 with the reduced diameter is formed at the peripheries of the plates 22b and 24b with the small width dimensions, the plates 22a and 24a with the large width dimensions are rubbed against the plates 22b and 24b with the small width dimensions. Accordingly, the coating 16 needs to have a low adhesive property.

The slip property and adhesive property of the conventional tire building drum to which stearic acid is applied and those of the tire building drum 10 of the present invention are evaluated. In the conventional tire building drum, the slip property is 250 g and the adhesive property is 1.2. Meanwhile, in the tire building drum 10 of the present invention, the slip property is 6 g and the adhesive property is 0.6. From this evaluation, it is found that the coating 16 of the tire building drum 10 of the present invention satisfies the required slip property and adhesive property.

Moreover, frequency of failures (tear, intrusion of air, and the like) in the inner liner of the green tire brought into contact with the outer peripheral surface of the drum main body in use of the conventional tire building drum is compared with that in use of the tire building drum 10 of the present invention. As a result, the frequency of failures in the tire building drum 10 of the present invention is reduced to half to quarter of the frequency of failures in the conventional tire building drum.

Figure 3:
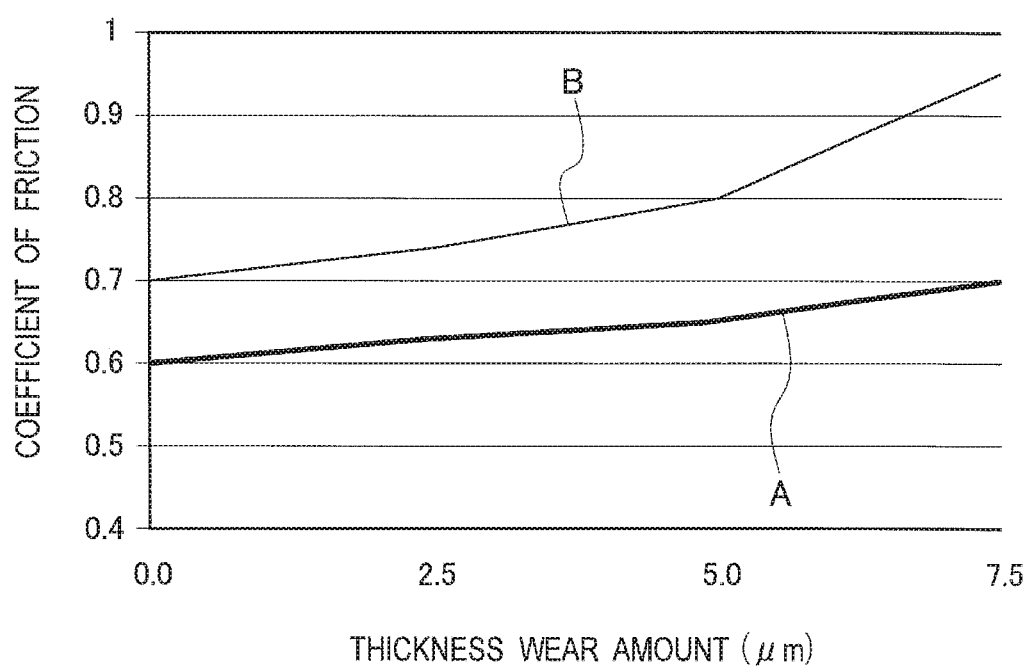
FIG. 3 is a graph depicting a change in coefficient of friction of the coating in the present invention with respect to a thickness wear amount and that of a coating made only of silicon.

Lastly, referring to FIG. 3, the line A and the line B respectively illustrate a change in coefficient of friction of the coating 16 in the present invention with respect to a coating thickness wear amount thereof and that of a coating made only of silicon. It is found from FIG. 3 that the change in coefficient of friction of the coating 16 in the present invention with an increase in the coating thickness wear amount (line A) is far smaller than that of the coating made only of silicon (line B).

As described above, in the present invention, silicon forming the silicon layer 26 defining the outer peripheral surface 14 of the drum main body 12 has a relatively good release property for the building member of the large green tire wound around the outer peripheral surface 14 of the drum main body 12, to be more specific, the inner liner which is the building member defining the inner surface of the green tire. In the present invention, the surface roughness Ra of the silicon layer 26 is set to 10 μm or greater. This setting reduces the adhesiveness and the friction property of the silicon layer 26 against the inner liner of the green tire, and can achieve easy release of the large green tire from the tire building drum 10 without using stearic acid.

Since the sprayed ceramic layer 28 has the porous structure, the sprayed ceramic layer 28 can be impregnated with part of the silicon layer 26. The silicon layer 26 can be thereby firmly held on the outer peripheral surface 14 of the drum main body 12.

Moreover, the sprayed ceramic layer 28 is formed on the formed sprayed stainless steel layer 30, and the silicon layer 26 is made to fixedly adhere to the sprayed ceramic layer 28. Accordingly, the shape of roughness defining the surface roughness (for example, Ra=18) of the sprayed stainless steel layer 30 fixedly adhering to the roughened outer peripheral surface 14 of the drum main body 12 appears on the silicon layer 26 through the sprayed ceramic layer 28 on the sprayed stainless steel layer 30. The silicon layer 26 can thereby have certain surface roughness.

Furthermore, the thickness dimension of the silicon layer 26, the thickness dimension of the sprayed ceramic layer 28, and the thickness dimension of the sprayed stainless steel layer 30 can be set within the range of 10 to 20 μm, the range of 40 to 60 μm, and the range of 80 to 120 μm, respectively.

The embodiment described above is merely an example described to facilitate the understanding of the present invention and the present invention is not limited to the embodiment. The technical scope of the present invention is not limited to the specific technical matters disclosed in the embodiment and also includes various modifications, changes, alternative techniques, and the like which can be easily derived from the embodiment.

The application claims the priority to Japanese Patent Application No. 2014-121440 filed Jun. 12, 2014, and the entire contents thereof is incorporated herein by reference.

INDUSTRIAL APPLICABILITY

In the present invention, silicon forming the silicon layer defining the outer peripheral surface of the drum main body has a relatively good release property for the building member of the large green tire wound around the outer peripheral surface of the drum main body, to be more specific, the inner liner which is the building member defining the inner surface of the green tire. In the present invention, the surface roughness Ra of the silicon layer is set to 10 μm or greater. This setting reduces the adhesiveness and the friction property of the silicon layer against the inner liner of the green tire, and can achieve easy release of the large green tire from the tire building drum without using stearic acid.

REFERENCE SIGNS LIST

10 tire building drum
12 drum main body
14 outer peripheral surface
16 coating
18 cover plate portion
20 segment portion
26 silicon layer
28 sprayed ceramic layer
30 sprayed stainless steel layer

The invention claimed is:

1. A tire building drum used to build a large green tire, comprising:
   a cylindrical drum main body having an outer peripheral surface, a diameter of the cylindrical drum main body being capable of being increased and reduced; and
   a coating formed on the outer peripheral surface of the drum main body, wherein
   the coating includes a silicon layer defining a surface of the coating, and
   the silicon layer has a surface roughness (Ra) of 10 μm or greater,
   wherein the coating includes a sprayed ceramic layer having a porous structure and impregnated with part of the silicon layer,
   wherein the coating includes a sprayed stainless steel layer having a surface roughness (Ra) of 16 μm or greater and fixedly adhering to the outer peripheral surface of the drum main body which is roughened, and the sprayed ceramic layer is formed on the sprayed stainless steel layer,
   wherein a thickness dimension of the silicon layer is within a range of 10 to 20 μm,
   a thickness dimension of the sprayed ceramic layer is within a range of 40 to 60 μm, and
   a thickness dimension of the sprayed stainless steel layer is within a range of 80 to 120 μm.

* * * * *